US009639082B2

(12) United States Patent
D'Angelo et al.

(10) Patent No.: US 9,639,082 B2
(45) Date of Patent: May 2, 2017

(54) MODULE FOR MONITORING INDUSTRIAL PROCESSES

(75) Inventors: Giuseppe D'Angelo, Orbassano (IT); Giorgio Pasquettaz, Orbassano (IT); Andrea Terreno, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 1048 days.

(21) Appl. No.: 13/502,286

(22) PCT Filed: Oct. 27, 2010

(86) PCT No.: PCT/IB2010/054859
§ 371 (c)(1),
(2), (4) Date: May 24, 2012

(87) PCT Pub. No.: WO2011/051889
PCT Pub. Date: May 5, 2011

(65) Prior Publication Data
US 2012/0245893 A1  Sep. 27, 2012

(30) Foreign Application Priority Data
Nov. 2, 2009  (IT) ................................ TO20090158

(51) Int. Cl.
*G05B 19/418* (2006.01)
*G07C 3/14* (2006.01)
(52) U.S. Cl.
CPC .................. *G05B 19/41875* (2013.01); *G05B 2219/25186* (2013.01); *G05B 2219/33192* (2013.01);
(Continued)
(58) Field of Classification Search
CPC .... G05B 19/41875; G05B 2219/25186; G07C 3/14
(Continued)

(56) References Cited
U.S. PATENT DOCUMENTS 6,795,778 B2 * 9/2004 Dodge et al. .................... 702/34
2004/0098218 A1 * 5/2004 Ito et al. ........................ 702/138
(Continued)

FOREIGN PATENT DOCUMENTS
EP        1677170        7/2006

OTHER PUBLICATIONS
International Search Report for PCT/IB2010/054859 mailed Mar. 14, 2011.
(Continued)

Primary Examiner — Ricky Ngon
(74) Attorney, Agent, or Firm — Nixon & Vanderhye P.C.

(57) ABSTRACT

A module for monitoring industrial processes for use in a system for monitoring industrial processes that comprises sensor means (7; 17) for detecting process quantities in a process station (20), acquisition means (8, 32; 32'; 32") for acquiring measurement signals (R) issued by said sensor means (7; 17), processing means (9; 19) operating on signals (T; T1) generated by said acquisition means (8, 32; 32'; 32") to obtain information on the quality of the process, and means for managing the production flow (9; 19), which operate on the basis of said information on the quality of the process and are located in a workstation (50) that is remote with respect to said process station, said monitoring module (30) being configured for being set locally at said at least one process station (20) for receiving measurement signals (R) issued by said sensor means (7; 17). Said monitoring module (30), set locally at said process station (20) comprises means (32") for acquisition and processing of the measurement signals (R), which in turn comprise means (33) for encoding said measurement signals (R) generated by said sensor means (17) into encoded signals, and wireless transmission means (42) associated to said acquisition means (32") configured for sending the encoded signals (T; T1) generated by (Continued)

said acquisition means (32") to corresponding wireless receiver means (82; 43) comprised in said remote workstation (50) that comprises said means for managing the production flow (19) and said processing means (9), which operate on signals (T; T1) generated by said acquisition means (32") to obtain information on the quality of the process, said acquisition means (32") comprising a voltage-to-frequency converter (72) for converting said measurement signals (R) into a pulse train (T1) at a variable frequency greater than or equal to 65 536 Hz.

11 Claims, 5 Drawing Sheets

(52) U.S. Cl.
CPC ...... *G05B 2219/37494* (2013.01); *G07C 3/14* (2013.01); *Y02P 90/22* (2015.11)

(58) Field of Classification Search
USPC .......................................................... 702/182
See application file for complete search history.

(56) References Cited

U.S. PATENT DOCUMENTS

| 2005/0210340 A1* | 9/2005 | Townsend ............. G08C 17/02 |
| | | 714/701 |
| 2006/0149508 A1* | 7/2006 | D'Angelo et al. ............ 702/188 |
| 2006/0163227 A1* | 7/2006 | Hillen et al. ............ 219/130.01 |

OTHER PUBLICATIONS

Written Opinion of the International Searching Authority mailed Mar. 14, 2011.
D. Azzi et al., "Wireless Temperature Sensing for Building Management Systems", Nov. 14, 1996, pp. 2/1-2/4.

* cited by examiner

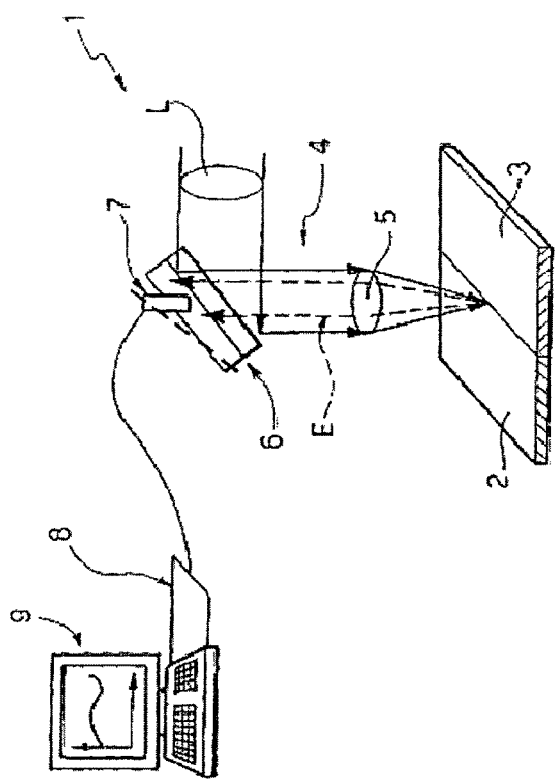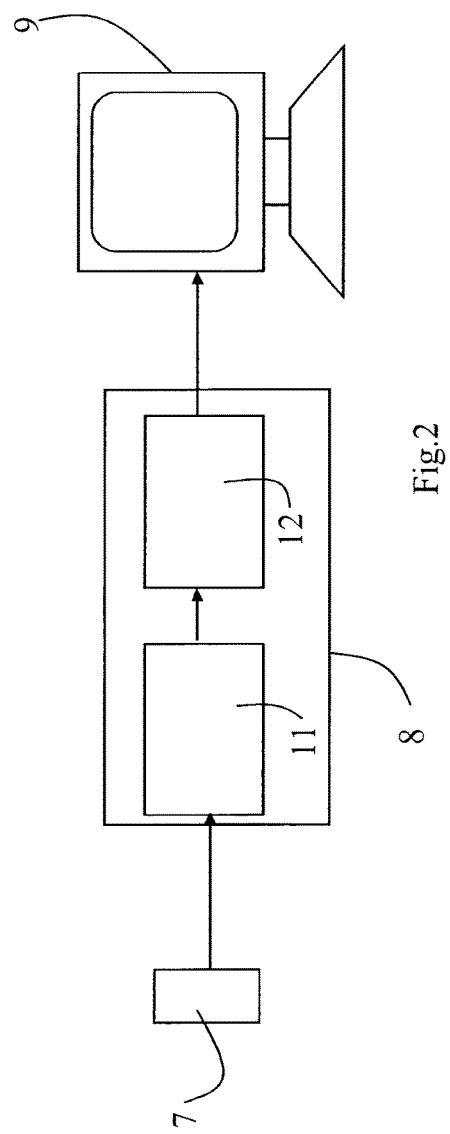

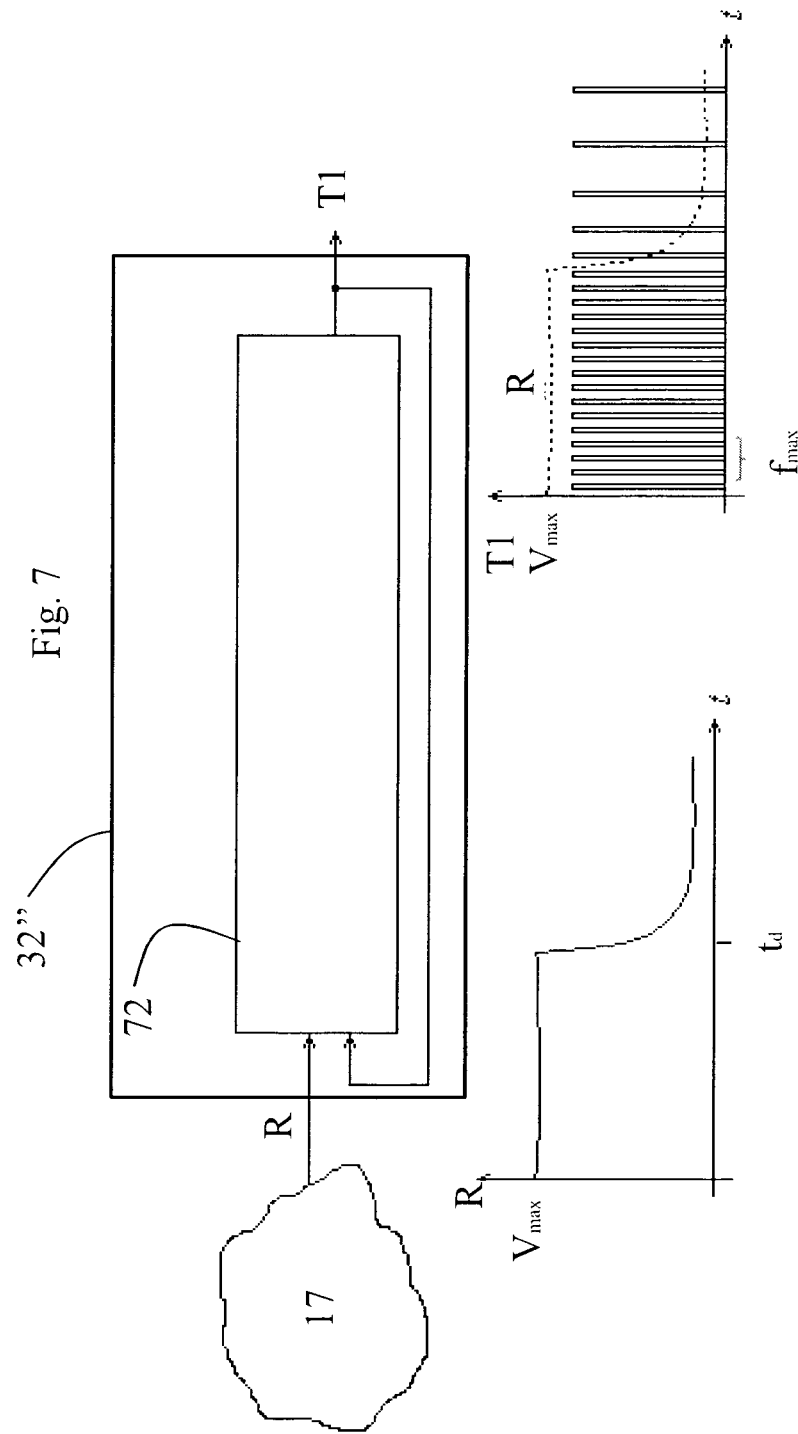

MODULE FOR MONITORING INDUSTRIAL PROCESSES

This application is the U.S. national phase of International Application No. PCT/IB2010/054859 filed 27 Oct. 2010 which designated the U.S. and claims priority to IT TO2009U000158 filed 2 Nov. 2009, the entire contents of each of which are hereby incorporated by reference.

The present invention relates to monitoring modules for use in systems and procedures for monitoring industrial processes, which comprises: sensor means for detecting one or more process quantities in at least one process station; acquisition means for acquiring measurement signals issued by said sensor means; processing means operating on signals generated by said acquisition means to obtain information on the quality of the process, and means for managing the production flow, which operate on the basis of said information on the quality of the process and are located in a workstation that is remote with respect to said process station, said monitoring module being configured for being set locally at said at least one process station.

Procedures and systems of the type referred to above have already been proposed and used in the past for carrying out on-line monitoring, for example, of laser-welding processes, in particular in the case of welding of sheet metal. The control system is able to assess the presence of porosities in the weld zone or else, in the case of butt-welded thin sheet metal, the presence of defects due to the overlapping or to the disjointing of the sheet metal. Similar systems have also been used for the control of the quality of cutting operations executed by laser means.

Represented in FIG. 1 is a system for the control of the quality of a laser process of a known type.

With reference to FIG. 1, the number 1 designates as a whole a system for the control of the quality of a laser process, for example a process of laser welding. The example regards the case of two metal sheets 2, 3, which are welded in a workstation or process station by means of a laser beam. The number 4 designates as a whole the focusing head, including a lens 5 reached by the laser beam originated by a laser generator (not illustrated) and reflected by a half-reflecting mirror 6, after passage through a lens L. The radiation E emitted by the weld zone passes through the half-reflecting mirror 6 and is detected by a sensor 7 constituted by a photodiode, which is able to send its signal at output to an electronic control and processing unit 8 associated to a personal computer 9 that manages the process.

In a concrete embodiment, the half-reflecting mirror 6 used is a ZnSe mirror, with a diameter of 2 ins. and a thickness of 5 mm. The sensor 7 is a photodiode with a spectral response comprised between 190 and 1100 nm, an active area of 1.1×1.1 mm, and a quartz window.

Illustrated in greater detail in FIG. 2 is the electronic control and processing unit 8 associated to the personal computer 9. Said processing unit 8 comprises an anti-aliasing filter 11, which operates on the signal sent by the sensor 7. Hence, an acquisition card 12 is provided equipped with an analog-to-digital converter, which samples the signal filtered and converts it numerically. Said acquisition card 12 is directly associated to the personal computer 9.

The acquisition card 12 acquires the signal issued by the sensor 7 at a frequency higher than $2^{16}$ Hz.

Implemented in the personal computer 9 is a quality-control procedure based upon analysis of the acquired signal.

The drawback of the systems used so far lies in the fact that the sensor set within the focusing head, which detects the radiation coming from the welding process, is connected to the acquisition card located in the personal computer, which controls the process through an appropriate wiring.

Said wiring, however, creates difficulties in the remote arrangement of the acquisition and processing systems. Furthermore, the wiring leads to further and greater drawbacks in the case where a number of processes are to be controlled in different welding stations, when it becomes necessary to lay a number of connection cables. Said connection cables must in fact be of limited length, in order not to introduce an excessive noise on the signals that they carry. The passage of connection cables within the welding station leads to drawbacks due to magnetic interference with the power cables. Furthermore, said connection cables, in order to be able to have a low noise, are of the high-impedance type and hence present a considerable cost.

The object of the present invention is to overcome all the aforesaid drawbacks.

In order to achieve said purpose, the subject of the invention is a monitoring module having the characteristics recalled specifically in the claims.

According to a preferred embodiment, the module forming the subject of the invention comprises a voltage-to-frequency converter, which issues pulses at a variable frequency starting from a specific value of minimum frequency.

Further characteristics and advantages of the invention will emerge from the ensuing description with reference to the annexed drawings, which are provided purely by way of non-limiting example and in which:

FIG. 1 is a schematic view of a system for monitoring industrial processes according to the known art;

FIG. 2 is a schematic view of a detail of the system of FIG. 1;

FIG. 7 is a further block diagram of said second embodiment;

FIGS. 8a and 8b show plots of signals used by said second embodiment; and

In brief, monitoring modules are provided, which operate as smart units, locally in the workstations, said smart units being configured for being assembled directly on the sensors and acquiring the signals of said sensors, then encoding, once again locally, said signals for a wireless transmission to remote processors, which carry out monitoring of the processes, assessing the defects and implementing, for example, procedures for managing rejects.

Figure 3:
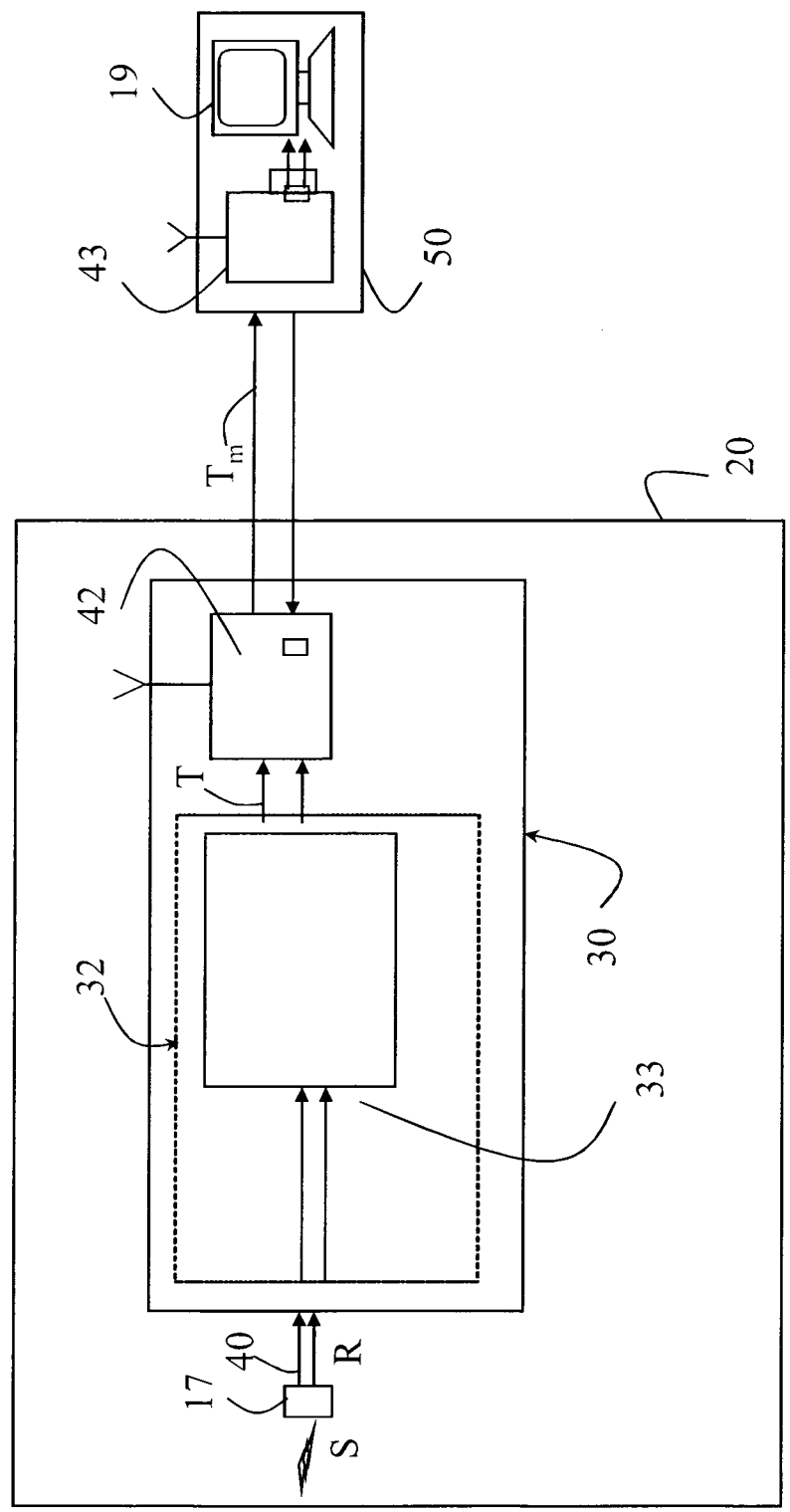
FIG. 3 is a block diagram of the monitoring module in use in a system for monitoring industrial processes according to the invention.

Represented in FIG. 3 is a block diagram of the system for monitoring industrial processes according to the invention, where designated by the number 17 is a sensor, set for example within the focusing head of a $CO_2$ laser, or within the cavity if the laser is of a neodimium-YAG type, in a workstation 20. Said sensor 17 is hence located in the proximity of the workstation 20 and detects a radiation S coming from the process of laser welding, generating an analog voltage signal R, in particular between 0 and 0.5 V.

Said analog voltage signal R is transferred to an acquisition and encoding module 32.

The connection, designated by the reference number 40, between the sensor 17 and the acquisition module 32, according to a preferred version of the invention, is a direct wireless connection. In other words, preferably, the acquisition and encoding module 32 and the sensor 17 constitute an integral module, for example in the form of printed board or integrated circuit directly connected to the voltage output of the sensor 17, for example by welding.

The acquisition module 32 is programmed for managing acquisition of the analog voltage signal R by the sensor 17 and encoding it through an encoding module 33, comprised therein, which issues a serial signal T, i.e., a serial representation of the values measured by the sensor 17 regarding the process in progress in the neighbouring workstation 20. Said processing is executed by means of a procedure for monitoring the process information, in particular for assessment of the quality of the process, said procedure being implemented via software loaded previously on a personal computer 19. Examples of processing procedures for determining the quality of a weld suited to being implemented in the system proposed herein can be inferred, by way of non-limiting example, from the European patent publications Nos. EP 1361015, EP 1275464, and EP 1371443 filed in the name of the present applicant.

The serial signal T is then transmitted as wireless signal $T_m$ by means of a radiotransmitter unit 42, which uses, for example, the Bluetooth protocol, in particular a 2.4-GHz Bluetooth transmitter. The radiotransmitter unit 42 may also be a conventional wireless audio/video transmitter, which operates at 2.4 GHz, like the ones used for transmitting surveillance-camera signals or for the Wi-Fi standard.

From what has so far been described, it emerges clearly that the acquisition module 32, comprising the encoding module 33, and the radiotransmitter unit 42 constitute the monitoring module 30, included in a single housing, which is set locally in the workstation 20 and is integral to the sensor 17, or, alternatively, can be integrated in the sensor 17 via a simple operation of assemblage, such as a fast coupling or weld.

The serial signal T irradiated as wireless signal $T_m$ by the radiotransmitter unit 42 is then received at a remote workstation 50 by a corresponding radioreceiver unit 43, designed, that is, to operate on radio signals, for example of a Bluetooth type.

The signal received, appropriately decoded, is then transferred to the personal computer 1, which functions as supervisor of the industrial processes and analyses in a known way the measurement data contained in the serial signal T for assessing the quality of the weld.

Said supervising personal computer 19 has in particular the function of managing the production flow, implementing procedures for managing rejects and for generating a data bank of the progress of the production process on the basis of the processing of the serial signal T.

Figure 4:
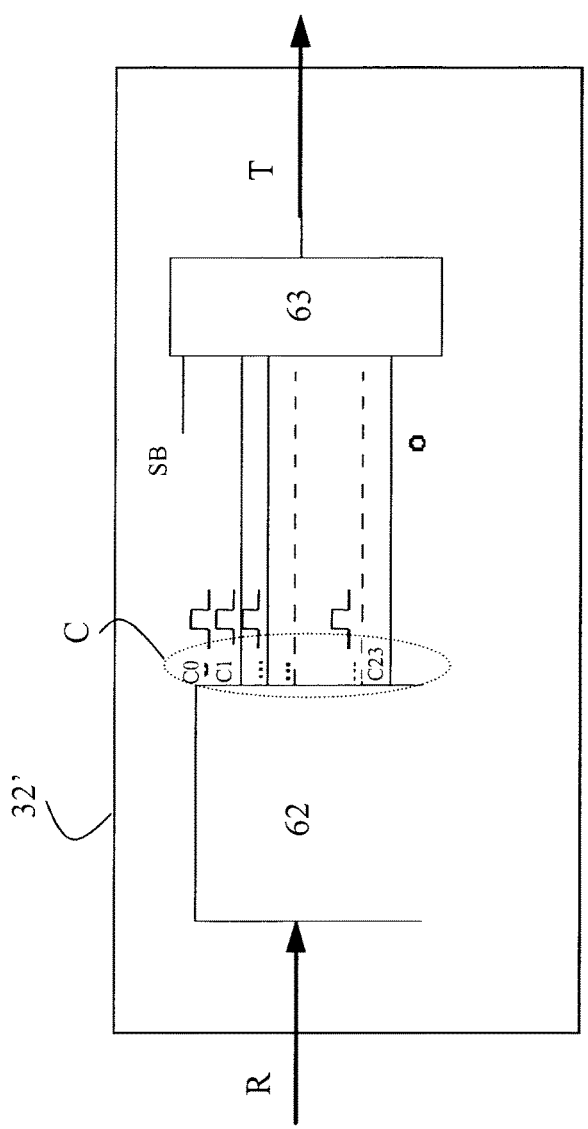
FIG. 4 is a block diagram of a first embodiment of a module in use in the system of FIG. 3.

Represented in FIG. 4 is a block diagram that details a first embodiment 32' of the acquisition module, where the sensor 17 issues the analog voltage signal R, with dynamics of +/−0.5 V and variable frequency higher than 40 kHz to a 24-bit analog-to-digital conversion module 62, which carries out sampling at a sampling frequency of 32 768 Hz and issues at output a parallel signal C, comprising bits C0 . . . C23. Said parallel signal C is supplied to a multiplexer 63, which generates the serial signal T, as described in what follows.

Figure 5:
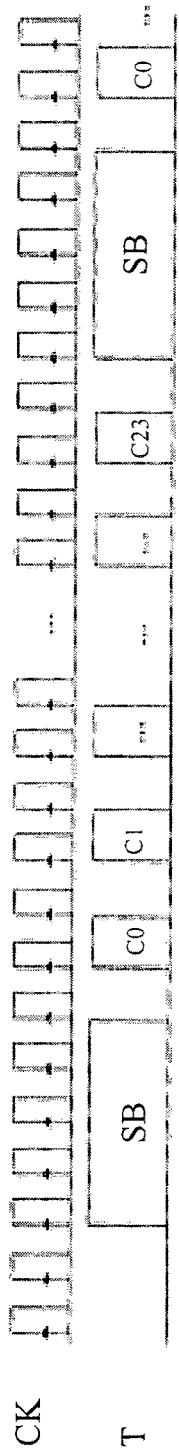
FIG. 5 is a diagram representing a signal generated by the module of FIG. 4.

For each analog datum of the signal R, sampled by the module 62 at 32 768 Hz, as represented in the diagram of FIG. 5, which represents the serial signal T generated by the multiplexer 63 and a clock signal CK that times operation thereof, the multiplexer 63 receives a start bit SB with a duration of 4 high bits (4 high clock cycles).

Then, the multiplexer 63 enters the first bit C0, in a clock cycle, followed by a logic zero in the next clock cycle, then the second bit C1, and again a zero, each entry having the duration of one clock cycle, until the final bit C23 is entered, followed, at the next clock cycle, by a final zero. Entry of the zeros in the multiplexer 63 is symbolized by an appropriate input 0 in FIG. 4.

In this way, for each analog datum of the signal R acquired at 32 768 Hz, 53 bits are transmitted serially in the serial signal T. This means that the output frequency of the serial signal T is at least 53·37268=1 736 704 Hz, which, however, can be supported without any problem by the transmitter 42 that operates at 2.4 GHz.

In a "classic" circuit, the analog voltage signal R coming from the sensor, in order to be transmitted at a certain distance, would need an adequate transmission cable. Theoretically, in reception it would hence be possible to acquire the signal R at any frequency, limited only by the goodness of the cable.

If the signal R is acquired from the sensor 17 with the 24-bit analog-to-digital conversion module 62 and transmitted in wireless mode via the transmitter 42, the band of the signal is subject to the number of bits of the converter used, specifically 24 bits, given that these must be transmitted in the wireless channel at 2.4 GHz. The greater the number of bits of the analog-to-digital converter, the greater the number of bits that are to be transmitted in wireless mode and hence the more slowly the signal of the sensor R has to be acquired, thus determining a smaller band of acquisition of the signal R. Consequently, if we assume that the aim is to acquire a 24-bit signal, more than 24 bits will have to be transmitted to the transmitter, it being necessary to include also at least the start and stop bits that identify the sequence. Consequently, the frequency, and hence the band, with which the signal R is acquired with the first embodiment 32' of the acquisition module is low.

Figure 6:
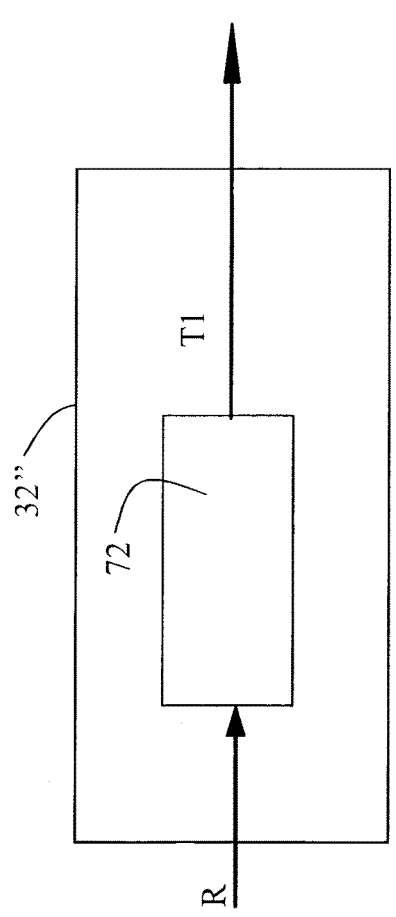
FIG. 6 is a block diagram of a second embodiment of a module in use in the system of FIG. 3.

Illustrated in FIG. 6 is a second embodiment 32", which envisages use as acquisition and encoding module of a voltage-to-frequency converter module 72.

Said module 72 converts the analog datum into a pulse train at a variable frequency T1, i.e., with pulses set at different distances apart, as illustrated in FIG. 6. The variation of frequency of the train T1 varies with the amplitude of the analog datum.

Illustrated in FIG. 7 is a block diagram of the converter module 72, which receives at input the signal R of the sensor, which is an analog voltage, and supplies at output the pulse train or sequence T1 at a variable frequency. The pulse train T1 is also supplied in feedback to the input of the converter module 72 in order to control better the output frequency thereof. When the signal R has high values of amplitude, the pulse frequency of the train T1 is high, whereas, as the amplitude of the signal R decreases, the frequency of the pulse train T1 decreases. The variable-frequency pulse train T1 generated in this way is sent to the wireless transmitter 42 operating at 2.4 GHz, which transmits it as wireless signal $T1_m$.

The second embodiment 32" of the acquisition module, by using a voltage-to-frequency conversion, prevents having to use an A/D converter that issues at output a digital signal with a given number of bits.

The voltage-to-frequency converter module 72 detects at each instant the voltage at its inputs determined by the signal R and is able to generate a pulse train at a variable frequency according to the voltage level at input. Illustrated in particular in FIG. 8a is a possible time plot of the analog voltage signal R coming from the sensor 17. Said plot shows the analog voltage signal R that starts from a value of maximum amplitude $V_{max}$, which remains approximately constant up to the instant $t_d$, where it decreases. FIG. 8b represents said analog voltage signal R superimposed on the pulse train T1 at output from the voltage-to-frequency converter module 72:

for high values of voltage R, the pulse train will have a very high frequency; for values of maximum amplitude $V_{max}$ there is associated a maximum frequency $f_{max}$, which in a preferred version is 625 kHz;

as the value of voltage of the signal R decreases, also the frequency of the pulse train decreases.

By guaranteeing a pulse frequency of the train T1 not lower than 65 536 Hz, during reconstruction of the signal at the receiver of the remote workstation, detailed hereinafter with reference to FIG. 9, a signal sampled at least at 65 536 Hz is obtained. In this way, irrespective of the sensor, it is as if the signal produced were always sampled at a high frequency, i.e., in particular a variable frequency, but higher than or equal to 65 536 Hz. The pulse train T1 has a pulse frequency preferably of not lower than 131 072 Hz. In practice, in a preferred version the voltage-to-frequency converter 72 operates between the maximum frequency of 625 kHz and the minimum frequency of 131 072 Hz.

When the pulse train T1 is sent to the transmitter 42, said transmitter transmits the pulses in a way similar to the one adopted for the serial signal T generated by the multiplexer 63. The differences in the case of the module 32" lie in the fact that the frequency of the pulses of the train T1 is variable and there are not 24 bits for each datum that is acquired by the converter module 62, the acquisition here being performed with the same operation of conversion from voltage level to an "acquired" variable-frequency pulse sequence, but only one bit or pulse in so far as the period of the pulse train T1 is able to provide the information on the value of voltage of the signal R.

Figure 9:
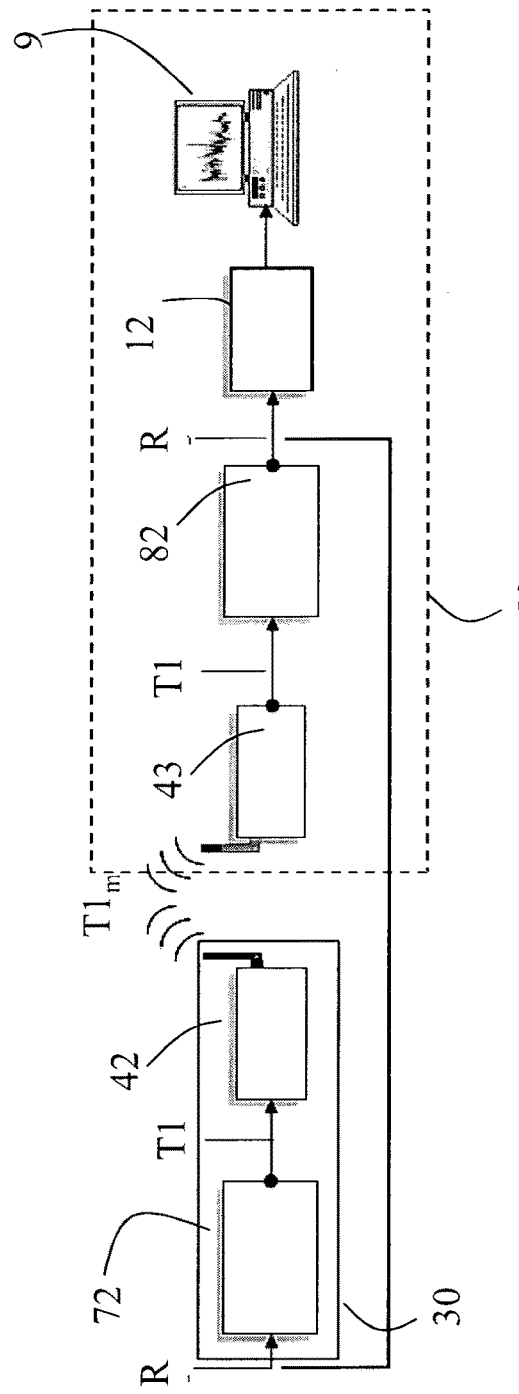
FIG. 9 is a block diagram of a modular monitoring system, which uses said second embodiment of the module according to the invention.

In FIG. 9, a diagram of the monitoring system in which the monitoring module 30 is in use comprises the acquisition module 32" with the voltage-to-frequency converter module 72.

At the reception end, the wireless radioreceiver unit 43 operating at 2.4 GHz is provided according to the protocol adopted by the transmitter 42 for transmitting the wireless signal $T1_m$. From the wireless signal $T1_m$ the wireless radioreceiver unit 43 produces at output the pulse train T1. Next, via a frequency-to-voltage converter 82 it is possible to reconstruct from the pulse train T1 the analog voltage signal R via the acquisition card 12 of the computer 9, which operates at 24 bits in a range from 0 Hz to 65 536 Hz, i.e., with admissible maximum frequency of acquisition by the card 12 of 65 536 Hz. In this way, by comparing the signal transmitted with the voltage-to-frequency converter 72 and received with the frequency-to-voltage converter 82 with a signal transmitted via cable and acquired by a 24-bit card 12 no differences are noted. There is thus obtained a transmission system that is able to transmit a process signal in the band from 0 Hz to 32 768 Hz with a resolution of 24 bits.

Transmission at the frequency of 2.4 GHz is chosen in so far as it affords two main advantages: the first advantage is represented by the reduction of the electromagnetic interference, which may cause problems during wireless transmission. The second advantage is represented by the high transmission bitrate that it enables. If signals that lie in the band from 0 Hz to 32 768 Hz are to be transmitted, for this reason it is necessary to have a sufficiently high transmission speed.

The transmission channel of the transmitter 42 is able to transmit without any alteration bits even with a duration of 800 ns.

Thanks to the characteristics that have been referred to above, the system according to the invention makes available a smart sensorized module, which constitutes an elementary unit capable of acquiring, encoding, and transmitting process-monitoring data from the workstation in which the industrial process is executed to a remote workstation, where the quality of the process is monitored and the production flow handled. Said system is particularly advantageous for use in the monitoring of laser-welding systems or systems in which the process signal to be detected has a high frequency dynamics, specifically up to 32 768 kHz.

Advantageously, in the system according to the invention, the monitoring module comprises simple modules, such as, for example, a converter, which do not require particular configurations for being adapted to different types of sensor, even where quantities of different types are measured. In other words, the monitoring module is advantageously independent of the type of sensor, so that, having a number of types of sensors that monitor one or more workstations, it is possible to consider associating to each a respective identical monitoring module according to the invention, via a simple operation of assemblage, such as welding of feet on a printed circuit.

The monitoring module according to the invention enables creation of a smart network, made up of a certain number of elementary smart units that interact appropriately with the remote supervisor processor. The solution proposed consequently enables simultaneous management of different production workstations, possibly even ones of various nature, in so far as the individual process is managed by the corresponding elementary smart unit.

The monitoring module according to the invention, using wireless communication, and hence eliminating the cables for connection between the sensor and the acquisition card on board the personal computer, renders possible creation of multisensor elementary monitoring units. Said multisensor units would be difficult to obtain in wired mode, since it would be necessary to provide a multiplicity of cables for the signal.

The module according to the invention, by eliminating the connection cables, moreover eliminates the problem of the noise due to the length of the connection cables with the managing computer and to the passage of said cables within the workstation, moreover obtaining a considerable reduction of the costs, it not being necessary to use cables with high impedance to obtain a low noise.

Furthermore, the monitoring module according to the invention, given the contained dimensions of the control and acquisition module, presents a considerable ease of installation, also on already existing workstations and hence not specifically pre-arranged ones.

Of course, without prejudice to the principle of the invention, the details of construction and the embodiments may vary widely with respect to what is described and illustrated herein purely by way of example, without thereby departing from the scope of the present invention.

As regards the wireless transmitter, it may implement radio-frequency transmission protocols and methods other than the Bluetooth standard, whether ones available on the market or purposely built ones, provided that they are able to transmit the quality signal at a distance and with the desired band specifications. In this regard, it may be noted that, since the quality signal requires a moderate bandwidth for its transmission, in the system according to the invention different choices are possible, such as for example the use of a very simplified transmitter with limited band, or else use of a transmitter with wider band, for example one available on the market, and use of the band not used for the transmission of the quality signal for implementing error-correction techniques, transmitting parity codes, or transmitting the signal with redundancy.

The remote workstation, which is remote with respect to said process station and which comprises said means for managing the production flow and the processing means to obtain information on the quality of the process, can comprise just one computer or processor or a number of computers or processors, even ones not located in the same place, which can implement the management and processing functions also in a distributed way over a number of processors.

The invention claimed is:

1. A module for monitoring industrial processes for use in a system for monitoring industrial processes, which comprises
   sensor means for detecting one or more process quantities in at least one process station,
   acquisition means for acquiring measurement signals issued by said sensor means,
   processing means operating on signals generated by said acquisition means to obtain information on the quality of the process, and
   means for managing the production flow, which operate on the basis of said information on the quality of the process and are located in a workstation that is remote with respect to said process station,
   said monitoring module being configured for being set locally in said at least one process station for receiving measurement signals issued by said sensor means,
   wherein said measurement signals issued by said sensor means are analog signals in the 0-32 768 Hz band,
   wherein said monitoring module, set locally in said at least one process station, comprises:
   means for acquisition and processing of the measurement signals, which in turn comprise means for encoding said measurement signals generated by said sensor means into encoded signals, and
   wireless transmission means associated to said acquisition means configured for operating at 2.4 GHz and sending the encoded signals generated by said acquisition means to corresponding to wireless receiver means comprised in said remote workstation that includes said means for managing the production flow and said processing means operating on signals generated by said acquisition means to obtain information on the quality of the process, and
   wherein said acquisition means comprises a voltage-to-frequency converter for converting said measurement signals into a pulse train at a variable frequency greater than or equal to 65 536 Hz,
   said remote workstation comprising wireless receiver means, at a radio frequency of 2.4 GHz, outputting said pulse train at a variable frequency greater than or equal to 65 536 Hz directly to a corresponding frequency-to-voltage converter that converts said pulse train received by the wireless receiver means, and an acquisition card, operating at a maximum frequency of 65 536 Hz, for acquiring the signal converted by said converter and supplying it to the processing means.

2. The module according to claim 1, wherein said wireless transmission means operate at radio frequency.

3. The module according to claim 2, wherein said radio-frequency wireless transmission means operate according to the Bluetooth standard.

4. The module according to claim 2, wherein said radio-frequency wireless transmission means operating at 2.4 GHz comprise a wireless audio/video transmitter operating at 2.4 GHz.

5. The module according to claim 2, wherein said voltage-to-frequency converter is configured for associating to values of maximum amplitude ($V_{max}$) of the measurement signals issued by said sensor means a maximum frequency ($f_{max}$) of 625 kHz.

6. The module according to claim 5, wherein said voltage-to-frequency converter is configured for operating between said maximum frequency ($f_{max}$) of 625 kHz and the minimum frequency of 131 072 Hz.

7. The module according to claim 1, wherein said monitoring module constitutes a module integral with said sensor means.

8. The module according to claim 1, wherein the module is comprised in a plurality of monitoring modules, which are set locally in respective workstations in use in a monitoring system comprising means for managing the production flow, which are configured for managing said workstations on the basis of said information on the quality of the process transmitted by said plurality of monitoring modules.

9. The module according to claim 1, wherein said means for managing the production flow are configured for executing procedures for managing rejects and for generating a data bank of the progress of the production process on the basis of the information of quality of the process.

10. The module according to claim 1, wherein said process station carries out a process of laser welding and in that said module is configured for receiving said measurement signals accordingly issued by said sensor means that detect said laser-welding process, which are analog signals comprised in the 0-32 768-Hz band.

11. A remote workstation for use in a system for monitoring industrial processes and co-operation with a monitoring module according to claim 1, wherein the remote workstation comprises
    wireless receiver means, at a radio frequency of 2.4 GHz,
    a frequency-to-voltage converter that converts the signal received by the wireless receiver means, said wireless receiver means being directly connected to said converter, and
    an acquisition card, operating at a maximum frequency of 65 536 Hz for acquiring the signal converted by said converter and supplying it to the processing means.

* * * * *